United States Patent [19]

Reed et al.

[11] Patent Number: 4,537,761

[45] Date of Patent: Aug. 27, 1985

[54] HYDROGEN STORAGE SYSTEM

[75] Inventors: Gordon A. D. Reed, Don Mills; Irwin J. Itzkovitch, Nepean, both of Canada

[73] Assignee: Liquid Carbonic Inc., Montreal, Canada

[21] Appl. No.: 611,343

[22] Filed: May 17, 1984

Related U.S. Application Data

[63] Continuation of Ser. No. 475,143, Mar. 14, 1983, abandoned.

[51] Int. Cl.³ .............................................. C01B 6/74
[52] U.S. Cl. ................................... 423/644; 420/900; 423/648 R
[58] Field of Search .................... 423/644, 645, 648 R; 420/900, 590, 402, 494; 62/48; 34/15

[56] References Cited

U.S. PATENT DOCUMENTS

| 4,079,523 | 3/1978 | Sandroch | 420/900 |
| 4,259,110 | 3/1981 | Pezat et al. | 420/900 |
| 4,278,466 | 7/1981 | dePous | 420/900 |
| 4,283,226 | 8/1981 | van Mal et al. | 420/900 |
| 4,300,946 | 11/1981 | Simons | 75/0.5 B |

FOREIGN PATENT DOCUMENTS 2078210 1/1982 United Kingdom ................ 423/645

OTHER PUBLICATIONS

Reilly et al., "The Reaction of Hydrogen with Alloys of Magnesium and Copper", Inor. Chem., vol. 6, No. 12, Dec. 1967, pp. 2220–2223.
Reilly et al., "Hydrogen Storage in Metal Hydrides", Date Unknown.
Reilly et al., "The Reaction of Hydrogen with Alloys of Magnesium and Nickel and the Formation of $Mg_2NiH_4$!", Inor. Chem., vol. 6, No. 12, Nov. '68, pp. 2254–2256.

Primary Examiner—L. Dewayne Rutledge
Assistant Examiner—Christopher W. Brody
Attorney, Agent, or Firm—Bachman and LaPointe

[57] ABSTRACT

A metal composition, particularly magnesium or a magnesium alloy is activated for hydrogen storage by a plurality of activation cycles each comprising a step of hydriding the metal composition followed by a dehydriding step; in this way the metal composition is activated for reaction with hydrogen for hydrogen storage, more efficiently and in less time than with prior techniques.

14 Claims, 1 Drawing Figure

HYDROGEN STORAGE SYSTEM

This is a continuation of application Ser. No. 475,143 filed Mar. 14, 1983, now abandoned.

BACKGROUND OF THE INVENTION (a) Field of the Invention

This invention relates to the storage of hydrogen, more especially the invention is concerned with a method of activating a metal for hydrogen storage, a method of storing hydrogen and a method for the storage and supply of hydrogen.

(b) Description of the Prior Art

Hydrogen is widely used in industry and improved techniques are desirable for storing and supplying hydrogen.

Hydrogen gas may be stored under high pressure in a cylinder or liquid hydrogen may be stored in a cryogenic container. These storage techniques exhibit certain hazards and disadvanages.

It has been proposed in U.S. Pat. No. 3,479,165 R. K. Lyon, issued Nov. 18, 1969, to employ magnesium hydride as a source of hydrogen. U.S. Pat. No. 3,479,165 indicates that hydriding magnesium turnings requires operation at 750°–850° F. and 1,000 psi for several days to obtain a reasonable conversion to the hydride.

The U.S. Patent is more especially concerned with a later stage after magnesium hydride has been formed and does not direct itself to overcoming the problem of the long hydriding period of several days.

Other techniques for hydrogen storage in which a hydride of a metal or metal alloy is formed are described in U.S. Pat. No. Re. 30,083; U.S. Pat. No. 4,079,523; U.S. Pat. No. 3,922,872 and U.S. Pat. No. 3,516,263, however, none of these patents contemplate the use of magnesium or a magnesium alloy.

The hydriding and dehydriding kinetics of magnetism in a magnesium-copper (Mg/MG$_2$Cu) eutectic alloy have been discussed by A. Karty et al in *J. Appl. Phys.* Vol. 50, No. 11, November 1979, pages 7200–7209, the disclosure of which is incorporated herein by reference.

Karty et al suggests that a Mg$_2$Cu phase provides an external surface that can be reduced of hydriding/dehydriding inhibiting oxides or surface adsorbed gases. The catalytic role of the Mg$_2$Cu phase has also been described by T. N. Dymova et al, *J. Inorg. Chem.* 6, 389 (1961).

SUMMARY OF THE INVENTION

It is an object of the present invention to overcome the disadvantages associated with activating metals, especially magnesium and magnesium alloys, for hydride formation.

In accordance with the invention there is provided a method of preparing a metal for metal hydride formation comprising: subjecting a particulate hydride-forming metal composition to a plurality of activating cycles to produce an activated particulate metal composition, each activating cycle comprising a step of hydriding the metal composition followed by a step of dehydriding the metal composition.

In another aspect of the invention there is provided a method of storing hydrogen which comprises hydriding the activated particulate metal composition.

In yet another aspect of the invention there is provided a method of supplying hydrogen which comprises thermally decomposing the hydride of the metal composition.

In still another aspect of the invention there is provided an apparatus for producing a supply of hydride. In particular the apparatus comprises housing means adapted to support a hydride for thermal decomposition, outlet means in said housing for delivery of hydrogen from said housing, at least one heating pipe having at least a portion projecting into the housing and heating means for heating said at least one pipe.

DESCRIPTION OF THE PREFERRED EMBODIMENTS

The metal composition employed in the invention is, in particular, magnesium or a magnesium alloy. As the alloying element there may be mentioned in particular copper, nickel and cobalt; especially preferred is an alloy of magnesium and copper which contains 9.5 wt.% of copper.

It is advantageous to pretreat the particulate metal compositions to reduce metal oxide coating at the surface of the particles. This can suitably be achieved by heating the particulate metal composition in the presence of hydrogen. Conveniently this reduction is carried out in a succession of cycles with the hydrogen atmosphere being flushed after each cycle to remove water as the reduction by-product.

In the activation of the particulate metal composition each cycle suitably comprises heating the particulate composition in a hydrogen atmosphere at a pressure of 500 to 650, preferably 550 to 600 psig. at a temperature below the sintering temperature of the particulate composition as an ingassing or hydriding step, and thereafter allowing the composition to cool in the hydrogen atmosphere to about room temperature as an out-gassing or dehydriding step. The cycles are carried out so that each cycle is completed in about 5 to about 15, preferably about 10 hours.

Suitably 2 to 20, preferably 4 to 10 and most preferably six cycles are employed.

In the case of the preferred magnesium/copper alloy, the heating is at a temperature below about 355° C. and suitably from 280° to 355° C., preferably about 350° C.

In each activation cycle the metal composition is hydrided during the heating and dehydrided in the subsequent cooling. This causes the metal crystals to separate. In particular the successive hydriding and dehydriding in the plurality of cycles produces stresses in the particulate composition which results in disintegration of the particles of the metal composition to a fine particle size, thereby increasing the surface area of metal available for hydride formation.

In this way the surface area of the particulate metal composition is optimized and in particular particles having a size of 40 microns may be produced from a particulate composition initially composed of 0.125 in. pellets.

In the hydriding stage of each successive activating cycle, the amount of hydrogen which reacts with the metal increases.

The activated particulate metal composition is reacted with hydrogen in a further hydriding step to store hydrogen and provide the metal hydride as a future source of hydrogen.

When the hydrogen is required the hydride is heated to decompose the hydride. In one embodiment heat pipes are employed to convey heat into a mass of the hydride power for ready release of the hydrogen.

EXAMPLE

A (Pretreatment)

A magnesium/copper alloy containing 9.5 wt.% of copper, in the form of a powder having a particle size of −35 Mesh (U.S. Sieve) was reacted in an autoclave at 350° C. at a hydrogen pressure of about 350 psig for about 30 minutes. The heating cycle was repeated three more times with change of the hydrogen atmosphere.

On completion of the four cycles, the oxide coating on the surface of the particles had been reduced and the deoxidized metal was ready for activation.

B (Activation)

Six activation cycles of 10 hours each were conducted on the pretreated alloy of A above, at a hydrogen pressure of 550 to 600 psig and a temperature of 345° C.

The activated alloy so produced was reacted with hydrogen at a temperature of about 345° C. and a hydrogen pressure of 550 to 600 psig to produce magnesium hydride.

C (Supply of Hydrogen)

The hydrided alloy of B was heated to about 375° C. by hot pipes extending into a bulk quantity of the hydride. In this way the hydride bed temperature was quickly and effectively raised to about 375° C. and the required energy of 8997 kcal/Kg of $H_2$ to 10.5 kWH/Kg$H_2$ provided for release of hydrogen from the hydride; the hydrogen was delivered as follows:

| | | |
|---|---|---|
| (i) | 78.5 wt. % of hydride sized −35 to +325 Mesh (U.S. Sieve) | 10.28 SCF $H_2$/lb of hydride (86.1% of theoretically deliverable $H_2$) |
| (ii) | 21.5 wt. % of hydride sized −325 Mesh (U.S. Sieve) | 10.65 SCF $H_2$/lb. of hydride (89.2% of theoretically deliverable $H_2$) |

DESCRIPTION OF A PREFERRED EMBODIMENT WITH REFERENCE TO THE DRAWING

Figure 1:
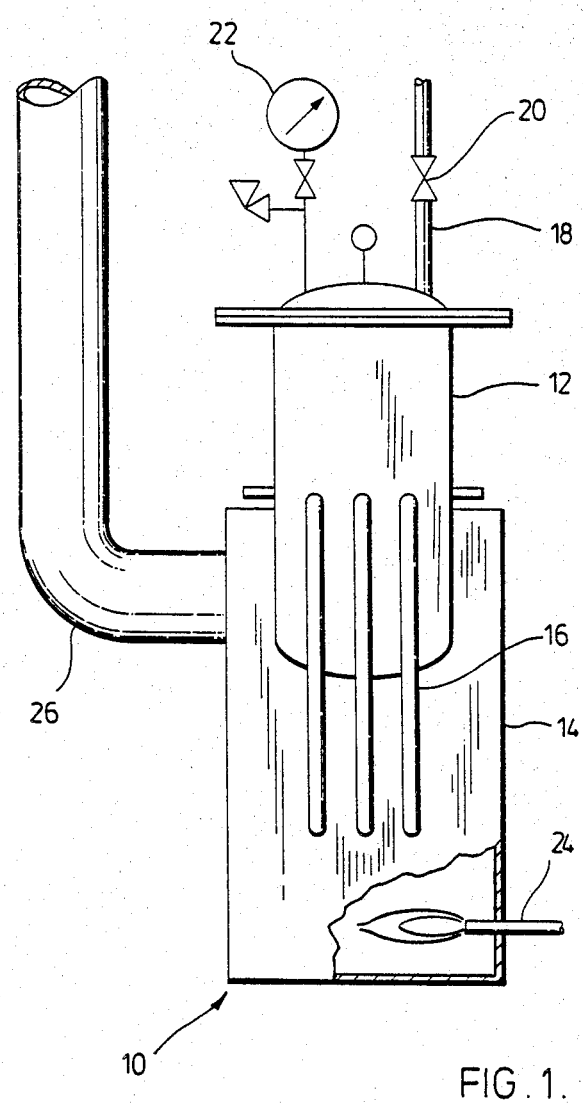
FIG. 1 illustrates schematically a heat pipe apparatus for generation of hydrogen from hydride, in accordance with a preferred embodiments of the invention.

With reference to FIG. 1 a heat pipe apparatus 10 comprises a housing 12 for hydride, a heating chamber 14 and heat pipes 16.

Housing 12 includes a hydrogen outlet pipe 18 having a valve 20, and a pressure guage 22.

Heating chamber 14 includes a fuel burner 24 and an exhaust stack 26.

Heat pipes 16 are filled with a salt and project from chamber 14 into housing 12.

In operation the housing 12 is filled with the hydride the heat generated in chamber 14 by burner 24, melts the salt in pipes 16, the molten salt heats the portion of pipes 16 in housing 12 and the heat of the molten salt is employed to thermally decompose the hydride in housing 12.

The hydrogen pressure in housing 12 is monitored at gauge 20 and hydrogen is delivered through pipe 18, as required, by opening valve 20.

Suitable fuels for use in burner 24 include natural gas, diesel oil and furnace oil.

The components of apparatus 10 may suitably be fabricated of carbon steel or alloy carbon steel which will withstand pressures of 100 psig and higher.

The heat pipes 16 may be in the form of a single pipe which may, for example, have an undulating, zig-zag of wave form, or the heat pipes may comprise a number of independent pipes filled with a salt.

It would also be possible to replace the heating pipes by a resistance coil extending into a bath of molten salt.

We claim:

1. A method of preparing a metal for metal hydride formation consisting essentially of:
   subjecting a particulate hydride-forming magnesium/copper alloy composition in which magnesium is the major component, to a plurality of sequential activating cycles to produce an activated particulate magnesium/copper alloy composition,
   each activating cycle comprising a step of heating the magnesium/copper alloy composition in hydrogen at a temperature of 280° to 355° C. and a pressure of 500 to 650 psig to hydride the magnesium/copper alloy composition followed by an immediate step of dehydriding the hydrided composition.

2. A method according to claim 1, wherein each cycle is completed in about 5 to about 15 hours.

3. A method according to claim 2, wherein said plurality comprises 4 to 10.

4. A method according to claim 1, wherein said composition is an alloy of magnesium and copper containing 9.5 wt.% of copper and said alloy is subjected to six activation cycles each of about 10 hours.

5. A method according to claim 4, wherein said temperature is about 280° to 345° C.

6. A method of storing hydrogen consisting essentially of:
   subjecting a particulate hydride-forming magnesium/copper alloy composition in which magnesium is the major component, to a plurality of sequential activating cycles to produce an activated particulate magnesium/copper alloy composition,
   each activating cycle comprising a step of heating the magnesium/copper alloy composition in hydrogen at a temperature of 280° to 355° C. and a pressure of 500 to 650 psig to hydride the magnesium copper alloy composition followed by an immediate step of dehydriding the hydrided composition, and
   hydriding the activated composition with hydrogen.

7. A method according to claim 6, wherein each cycle is completed in about 5 to about 15 hours.

8. A method according to claim 7, wherein said plurality comprises 4 to 10.

9. A method according to claim 6, wherein said composition is an alloy of magnesium and copper containing 9.5 wt.% of copper and said alloy is subjected to six activation cycles each of about 10 hours.

10. A method according to claim 9, wherein said temperature is about 280° to 345° C.

11. A method of storing and supplying hydrogen consisting essentially of:
   subjecting a particulate hydride-forming magnesium/copper alloy composition in which magnesium is the major component, to a plurality of sequential activating cycles to produce an activated particulate magnesium/copper alloy composition,
   each activating cycle comprising a step of heating the magnesium/copper alloy composition in hydrogen at a temperature of 280° to 355° C., and a pressure of 500 to 650 psig to hydride the magnesium/copper alloy composition followed by an immediate step of dehydriding the hydrided composition, hydriding the activated composition by reaction with hydrogen, storing the hydrided activated composition and subsequently, when a supply of hydrogen is desired, heating the hydrided activated composition to liberate hydrogen.

12. A method according to claim 11, wherein said composition is an alloy of magnesium and copper containing 9.5 wt.% of copper and said alloy is subjected to six activation cycles each of about 10 hours.

13. A method according to claim 12, wherein said hydride is heated at about 375° C. to liberate hydrogen.

14. A method of storing and supplying hydrogen consisting essentially of:

subjecting a particulate hydride-forming magnesium/copper alloy composition having a copper content of about 9.5 wt.% to a plurality of pretreatment cycles to reduce metal oxides at the surface of the particles, each pretreatment cycle consisting essentially of heating the particulate composition in an atmosphere of hydrogen followed by flushing with a non-oxidizing gas to remove water as the reduction by-product, subjecting the pretreated composition to 4 to 10 sequential activating cycles to produce an activated particulate magnesium/copper alloy composition, each activating cycle comprising a step of heating the composition in hydrogen at a temperature of about 350° C. and a pressure of 550 to 600 psig for about 5 to about 15 hours to hydride the composition, followed by an immediate step of dehydriding the hydrided composition, whereby the successive activating cycles produce stresses in the particulate composition resulting in disintegration of the particles and increase in the metal surface area available for hydride formation, hydriding the resulting activated fine particulate composition by reaction with hydrogen, storing the hydrided activated composition and subsequently, when a supply of hydrogen is desired, heating the hydrided activated composition at a temperature of about 375° C. to liberate hydrogen, and collecting the liberated hydrogen.

* * * * *